(12) United States Patent
Kurihara et al.

(10) Patent No.: US 7,821,188 B2
(45) Date of Patent: Oct. 26, 2010

(54) LIGHTING DEVICE AND DISPLAY DEVICE PROVIDED WITH THE SAME

(75) Inventors: Makoto Kurihara, Chiba (JP); Masashi Ono, Chiba (JP)

(73) Assignee: Seiko Instruments Inc. (JP)

( * ) Notice: Subject to any disclaimer, the term of this patent is extended or adjusted under 35 U.S.C. 154(b) by 447 days.

(21) Appl. No.: 12/011,974

(22) Filed: Jan. 30, 2008

(65) Prior Publication Data

US 2008/0231162 A1   Sep. 25, 2008

(30) Foreign Application Priority Data

Jan. 31, 2007   (JP)   ............................. 2007-021323

(51) Int. Cl.
  *H05B 33/00*   (2006.01)
  *H01L 33/00*   (2010.01)
(52) U.S. Cl. .................. 313/484; 313/487; 313/112; 362/84; 362/260; 362/28; 362/293
(58) Field of Classification Search ................. None
  See application file for complete search history.

(56) References Cited

U.S. PATENT DOCUMENTS 3,569,761 A * 3/1971 Lange ....................... 313/408

2006/0244367 A1 * 11/2006 Im et al. ..................... 313/503
2008/0303407 A1 * 12/2008 Brunner et al. ............. 313/496

* cited by examiner

*Primary Examiner*—Ashok Patel
(74) *Attorney, Agent, or Firm*—Adams & Wilks

(57) ABSTRACT

To provide a lighting device capable of a substantial color adjustment and unlimited control of spectral components, a lighting device of the present invention puts a first transparent plate in which a phosphor layer dispersed with a first phosphor is formed in places and a second transparent plate in which a phosphor layer dispersed with a second phosphor is formed in places in a path of light from a light source, and stacks the first transparent plate and the second transparent plate on top of each other. The second phosphor differs from the first phosphor. How much in terms of area the phosphor layers overlap with each other is made variable, and the color tone of the lighting device can thus be controlled. The lighting device uses a blue light source as its light source, a green phosphor as the first phosphor, and a red phosphor as the second phosphor. An intended chromaticity can be obtained by varying how much in terms of area the green phosphor layer and the red phosphor layer overlap with each other and thereby adjusting the green light absorption amount of the red phosphor.

11 Claims, 5 Drawing Sheets

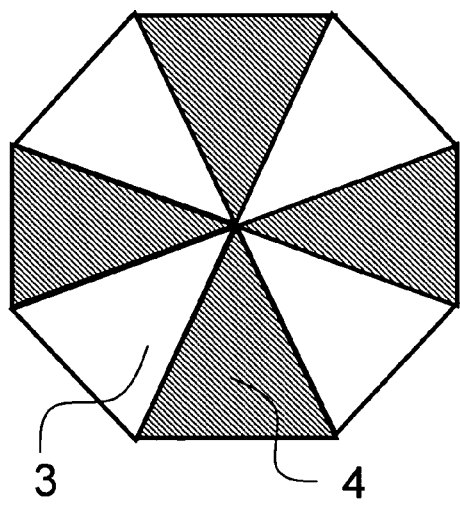
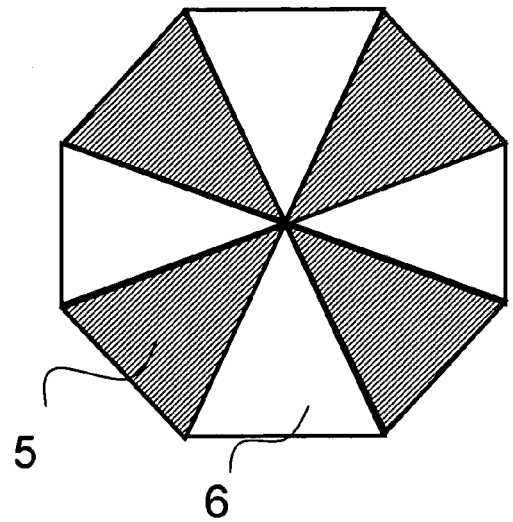
FIG. 7A    FIG. 7B
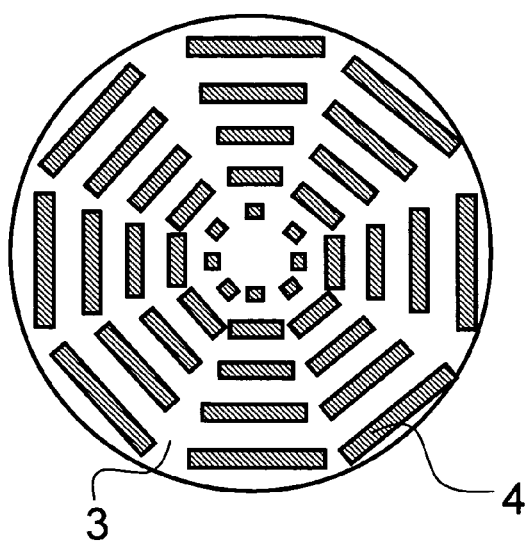
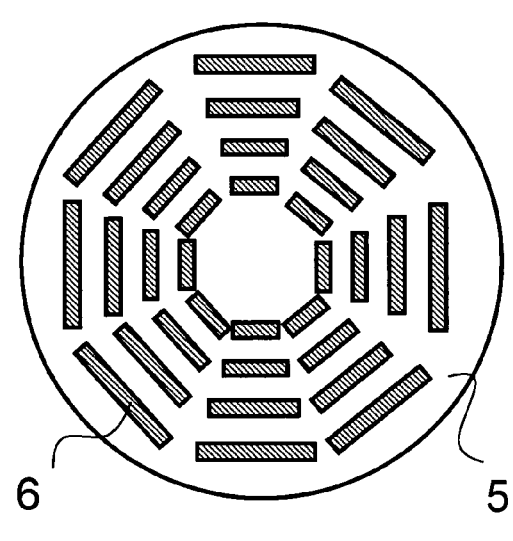
FIG. 8A    FIG. 8B

LIGHTING DEVICE AND DISPLAY DEVICE PROVIDED WITH THE SAME

BACKGROUND OF THE INVENTION

1. Field of the Invention

The present invention relates to a lighting device. More particularly, the present invention relates to a lighting device for articles on exhibition, objects of photo shooting, and the like, or a lighting device for illuminating liquid crystal display elements and the like.

2. Description of the Related Art

Conventional light sources for lighting devices such as incandescent lamps and cathode ray tubes have problems with regard to light emission efficiency and life span, and light emitting diodes (LEDs) are expected as future light sources. Light emitted by LEDs is of short wavelength color such as blue or green, and has to be turned into white light when used for illumination. A known way to turn LED light into white light is to mix light emitted by a red LED, light emitted by a blue LED, and light emitted by a green LED. As disclosed in JP 05-152609 A, using a blue LED in combination with a yellow phosphor, typically YAG, to obtain pseudo-white light is a widely practiced method. Most light sources that are called white LEDs employ this method, too. Problems with white LEDs, which have very little green and red components, are that their color-rendering properties are lacking and that it is difficult to adjust their chromaticity. While the problem of the color-rendering properties can be solved by using a near-ultraviolet LED, the package reliability and light emission efficiency of white LEDs are still issues at present.

In the case of an LED package that covers an LED element with resin containing a phosphor, the chromaticity can be adjusted by varying the amount of the phosphor mixed in the resin, but the problem is that the phosphor precipitates before the resin cures, thereby making the actual chromaticity off the intended chromaticity. A solution to this problem has been published in which a phosphor containing portion is divided into multiple members so that a first phosphor containing member with a phosphor localized in some part of its body and a second phosphor containing member with the same localized phosphor are stacked on top of each other, and the chromaticity is adjusted by varying the area ratio of the phosphor that can be seen from the light source (see, for example, JP 2006-332384 A). However, this and similar methods have been designed basically to improve the first run rate in mass production, and are good for a slight color tone adjustment, but not for a drastic color tone adjustment or unlimited control of spectral components.

SUMMARY OF THE INVENTION

The present invention has been made in view of the above, and an object of the present invention is therefore to provide a lighting device with which a substantial color adjustment and unlimited control of spectral components are easy.

A lighting device of the present invention places a first member having a region where a first phosphor is present and a region where the first phosphor is absent and a second member having a region where a second phosphor is present and a region where the second phosphor is absent in a path of light emitted by a light emitting element, and is structured such that how much in terms of area the first phosphor and the second phosphor overlap with each other in the light path can be varied. The color of the second phosphor differs from that of the first phosphor.

The region where the first phosphor is present is shaped like a matrix in which rectangular unit regions are arranged into a matrix pattern. The region where the second phosphor is present is also shaped like a matrix in which rectangular unit regions are arranged into a matrix pattern, and is positioned to coincide with the region where the first phosphor is present. This way, the overlapping in terms of area between the region where the first phosphor is present and the region where the second phosphor is present is small when the first member and the second member are stacked on top of each other while aligned with each other, and the overlapping in terms of area becomes larger as the second member is moved from that position with respect to the first member.

The longer sides of the rectangular unit regions are set parallel to the moving direction of the second member. The unit regions are not completely isolated from one another but are partially in contact with adjacent unit regions.

The first member and the second member may each have a circular shape and phosphors may be put in some places of the circular members. One of the circular members is rotated, and light emission by the light emitting element is timed with a change in how much in terms of area the first phosphor and the second phosphor overlap with each other.

The first member is interposed between the light emitting element and the second member, and a third member having a color filter layer in places is placed above the second member (the opposite side to the light emitting element).

The first phosphor is a green phosphor and the second phosphor is a red phosphor. The green phosphor employed is one of the following three: strontium thiogallate activated with a rare earth element; barium strontium silicate activated with a rare earth element; and $Ca_3Sc_2Si_3O_{12}$:Ce. The red phosphor employed is a chalcogenide compound phosphor composed of CaS, SrS, or a similar sulfide and a rare earth dopant, or a phosphor material composed of $(Ca, Sr)_2Si_5N_8$, $CaSiN_2$, or $CaAlSiN_3O_{12}$ and a rare earth dopant. The green and red phosphors are each mixed with epoxy resin and the mixture is placed in the first member or the second member to serve as a phosphor layer.

The light emitting element employed can be a blue light emitting diode, an ultraviolet light emitting diode, or an EL element.

A lighting device having any one of the above structures can be used for illumination of a non-self-luminous display element.

A substantial chromaticity change is thus made possible by using two or more types of phosphors and making how much in terms of area the different phosphors overlap with each other variable. Consequently, a lighting device capable of unlimited control of spectral components can be provided.

BRIEF DESCRIPTION OF THE DRAWINGS

In the accompanying drawings:

FIGS. 7A and 7B are frontal views schematically showing parts of still another lighting device according to the present invention;

FIGS. 8A and 8B are frontal views schematically showing parts of yet still another lighting device according to the present invention.

DETAILED DESCRIPTION OF THE PREFERRED EMBODIMENTS

In a lighting device of the present invention, a first phosphor layer with a first phosphor dispersed therein and a second phosphor layer with a second phosphor different from the first phosphor dispersed therein are stacked on top of each other in the path of light from a light source such that how much in terms of area the two phosphor layers overlap with each other can be varied. Specifically, a first transparent plate with the first phosphor layer formed in places and a second transparent plate with the second phosphor layer formed in places are stacked on top of each other in a manner that makes how much in terms of area the phosphor layers overlap with each other variable. The color tone of the lighting device can thus be controlled. The lighting device uses a blue light source as its light source, a green phosphor as the first phosphor, and a red phosphor as the second phosphor, with the green phosphor layer placed nearer to the blue light source. An intended chromaticity can be obtained by varying how much in terms of area the green phosphor layer and the red phosphor layer overlap with each other and thereby adjusting the green light absorption amount of the red phosphor.

Figure 1:
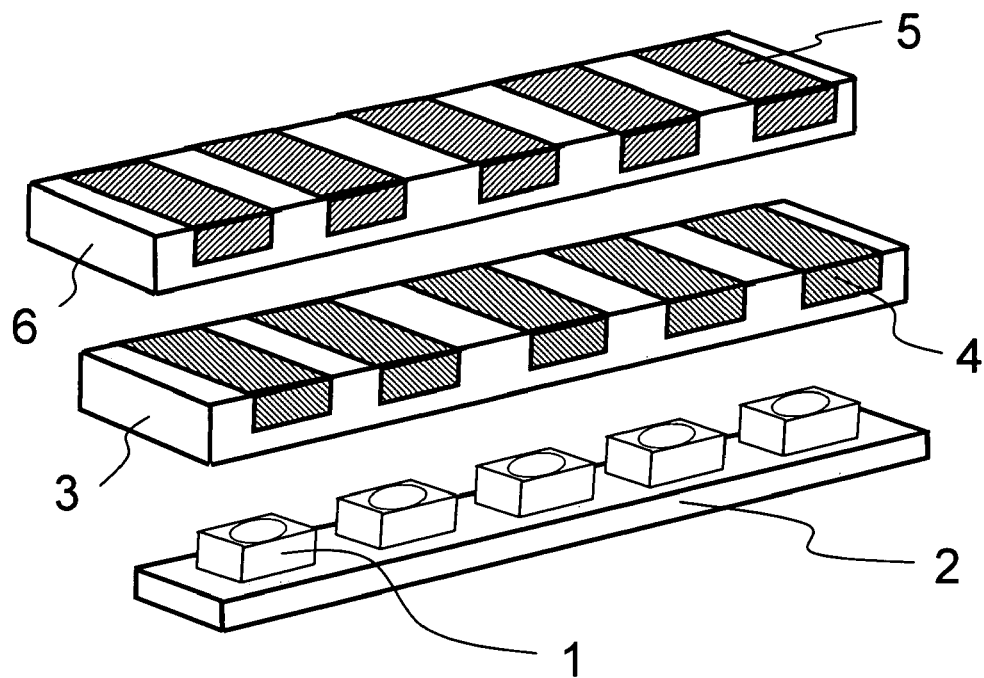
FIG. 1 is a perspective view schematically showing the structure of a light source portion of a lighting device according to the present invention.

A lighting device according to a first embodiment of the present invention will be described with reference to FIGS. 1 to 5. FIG. 1 is a perspective view schematically showing the structure of a light source portion of a lighting device according to the present invention. A light emission source 1 is surface-mounted on a substrate 2. The light emission source 1, which, in this embodiment, is a blue LED, may be a cathode ray tube, an EL element, or the like as long as the light source emits blue light. Examples of the substrate 2 include PCB and other glass epoxy substrates, and FPC and other flexible substrates.

A first transparent plate 3 is placed above the light emission source 1. Grooves with a depth of 0.1 mm to 0.5 mm and a width of 0.5 mm to 5 mm are cut in the first transparent plate 3 at a regular pitch. Examples of the transparent plate include acrylic, polycarbonate, and other similar materials machined to have a plate-like shape through cutting, injection molding, or the like. Glass materials are ideal for the transparent plate if optical characteristics and weather resistance alone are to be considered. The grooves are filled with transparent resin which is dispersed with phosphor particles and which is cured to form a first phosphor layer 4. For the first phosphor layer 4, this embodiment uses a green phosphor whose peak wavelength is between 500 nm and 550 nm. Green phosphors that are widely known and suitable for the first phosphor layer 4 are strontium thiogallate activated with a rare earth element, barium strontium silicate activated with a rare earth element, $Ca_3Sc_2Si_3O_{12}$:Ce, and the like. In the case where the light source emits light approximate to ultraviolet light, BaMgAl10017:Eu, Mn, and ZnS are suitable. The transparent resin in which the phosphor is dispersed can be silicon, epoxy, or acrylic-based transparent materials. In the case where thiogallate is employed, the transparent resin is desirably epoxy resin since the non-water-resistant nature needs to be compensated by anti-humidity measures.

A second transparent plate 6 in which a second phosphor layer 5 is formed is placed above the first transparent plate 3 in which the first phosphor layer 4 is formed. Grooves are dug in the second transparent plate 6 as in the first transparent plate 3. In this embodiment, the grooves in the second transparent plate 6 have the same depth, width, and pitch as those in the first transparent plate 3. The grooves in the transparent plates 3 and 6 need to have the same pitch but can have different depths and different widths. The second transparent plate 6 employs the same transparent plate and transparent resin materials as the ones employed in the first transparent plate 3. A second phosphor dispersed in the transparent resin of the second transparent plate 6 is a red phosphor whose peak wavelength is 600 nm or higher. Examples of the red phosphor include a chalcogenide compound phosphor composed of CaS, SrS, or a similar sulfide and a rare earth dopant, and a phosphor material composed of $(Ca, Sr)_2Si_5N_8$, $CaSiN_2$, or $CaAlSiN_3O_{12}$ and a rare earth dopant.

Figure 2:
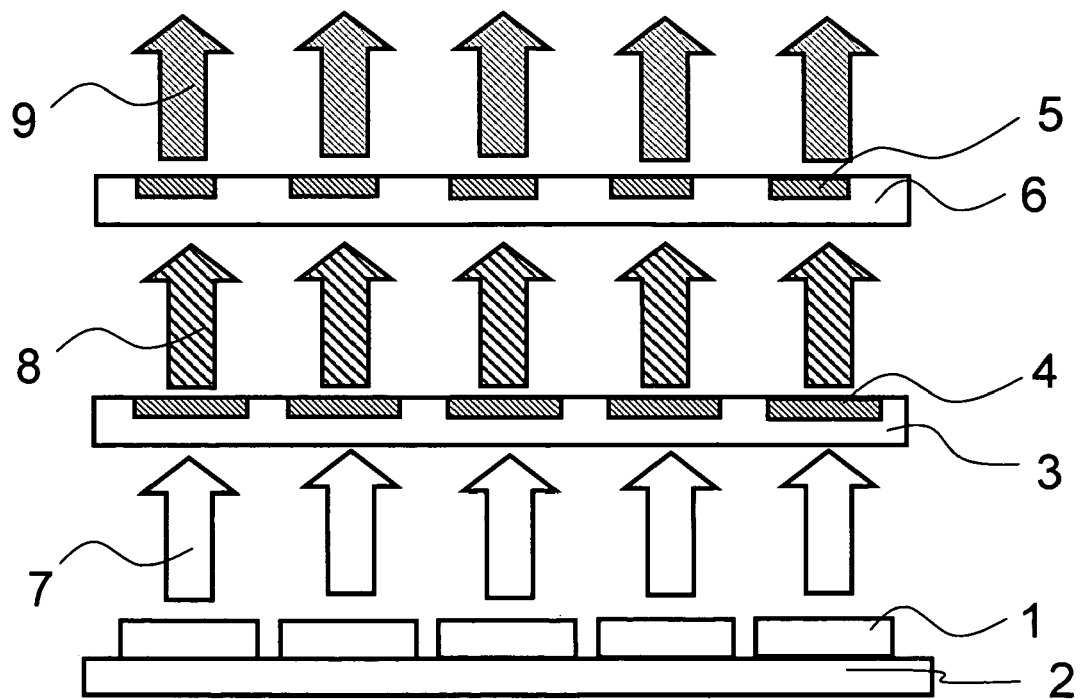
FIG. 2 is a sectional view schematically showing a function of the light source of the lighting device according to the present invention.
Figure 4:
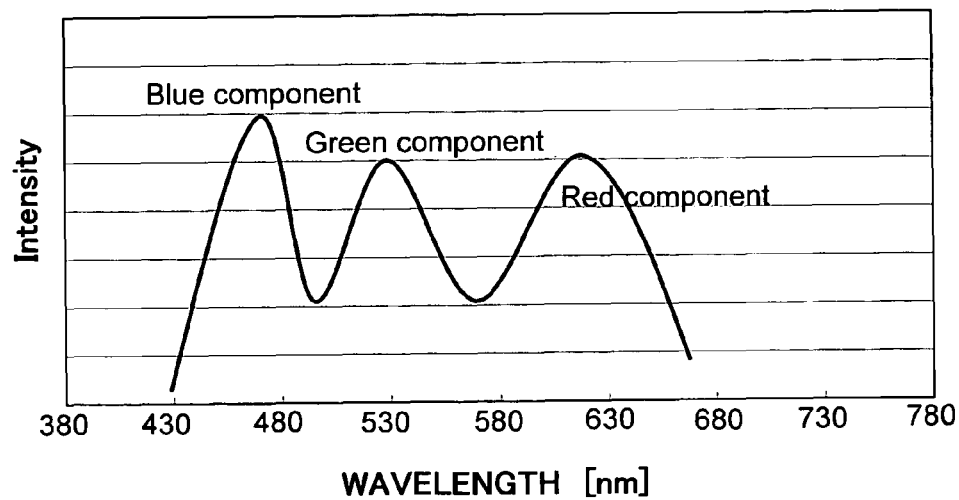
FIG. 4 is an image graph of the spectrum of the lighting device according to the present invention.

FIG. 2 is a sectional view schematically showing a function of the light source of the lighting device according to the present invention. Emitted light 7 which is emitted from the light emission source 1 passes through the first phosphor layer 4, thereby assuming a mixed color of the emitted light 7 and the phosphor light. In this embodiment, the emitted light 7 is blue light whose peak wavelength is between 440 nm and 490 nm whereas the phosphor light converted by the first phosphor is green light whose peak wavelength is between 500 nm and 550 nm. As a result, first color mixture light 8 which exits the first phosphor layer 4 has a color that is a mixture of blue and green. The first color mixture light 8 passes through the second phosphor layer 5, thereby assuming a mixed color of the first color mixture light 8 and second phosphor light. The second phosphor light converted by the second phosphor here is red light whose peak wavelength is 600 nm or higher, and most types of red phosphor contain green in their excitation wavelengths. Blue light and green light passing through the second phosphor layer 5 are therefore partially absorbed and converted into red light. An image graph of the spectrum of the light in FIG. 2 is shown in FIG. 4, which reveals that the intensities of the blue component, the green component, and the red component are distributed substantially evenly.

Figure 3:
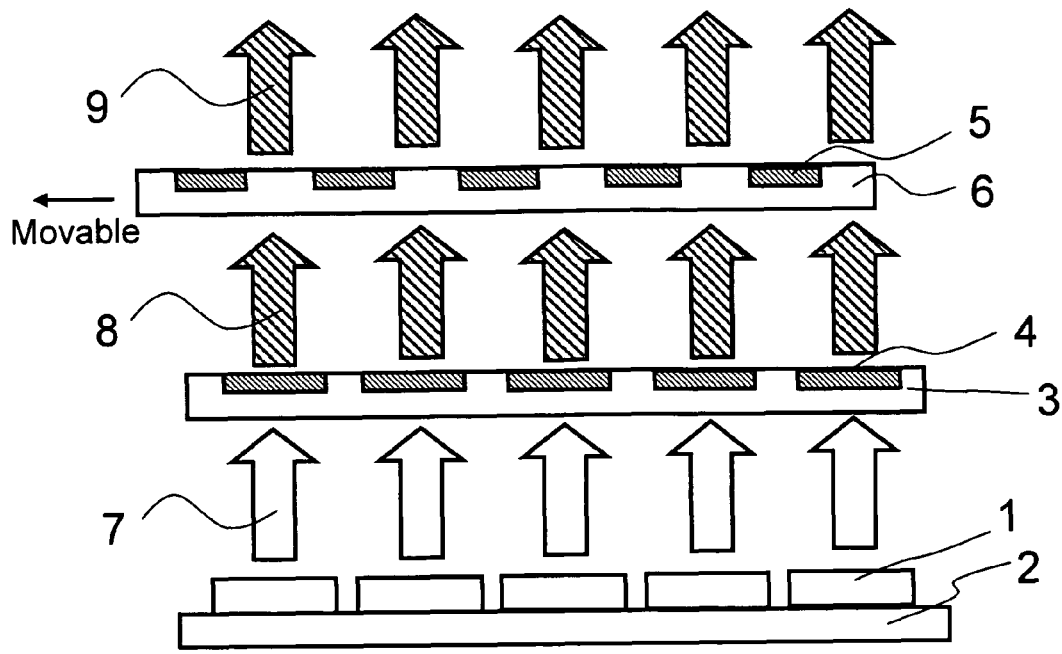
FIG. 3 is a sectional view schematically showing a function of the light source of the lighting device according to the present invention.
Figure 5:
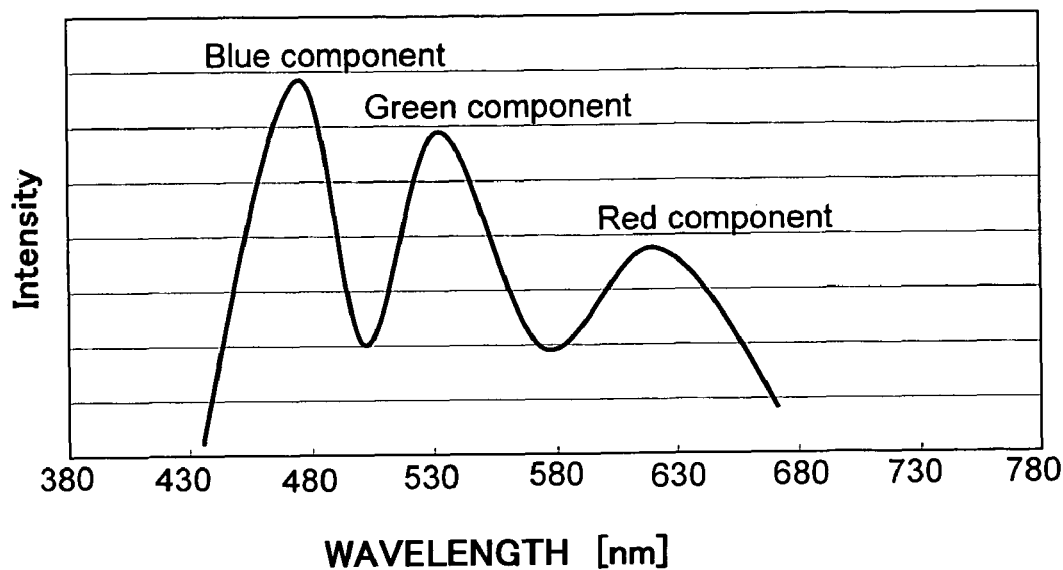
FIG. 5 is an image graph of the spectrum of the lighting device according to the present invention.

FIG. 3, too, is a sectional view schematically showing a function of the light source of the lighting device according to the present invention. The difference from FIG. 2 is where the second transparent plate 6 having the second phosphor layer 5 is placed. While the second transparent plate 6 in FIG. 2 is positioned such that most of the first color mixture light 8 hits the second phosphor layer 5, the second transparent plate 6 in FIG. 3 is positioned such that most of the first color mixture light 8 misses the second phosphor layer 5. This causes more blue component and more green component to get through and arrive at the other side of the second phosphor layer 5. The overall color tone of the resultant light is shifted to blue green from that of the light obtained when most of the first color mixture light 8 hits the second phosphor layer 5 as in FIG. 2. An image graph of the spectrum of the light in FIG. 3 is shown in FIG. 5. Compared to FIG. 4, the intensities of the blue component and the green component are higher in FIG. 5 and the intensity of the red component is accordingly slightly lower. Adjusting the position of the second transparent plate 6 thus makes it possible to adjust the color components of the exit light.

This embodiment uses only two types of phosphors, but three or more types of phosphors may be employed. Also, the number of the phosphor layers may be changed from two to three or more.

Figure 6A:
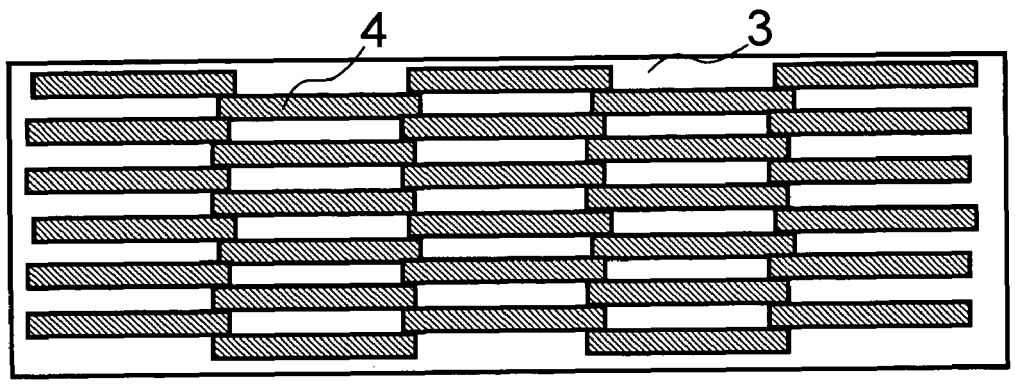
FIGS. 6A and 6B are frontal views schematically showing parts of another lighting device according to the present invention.
Figure 6B:
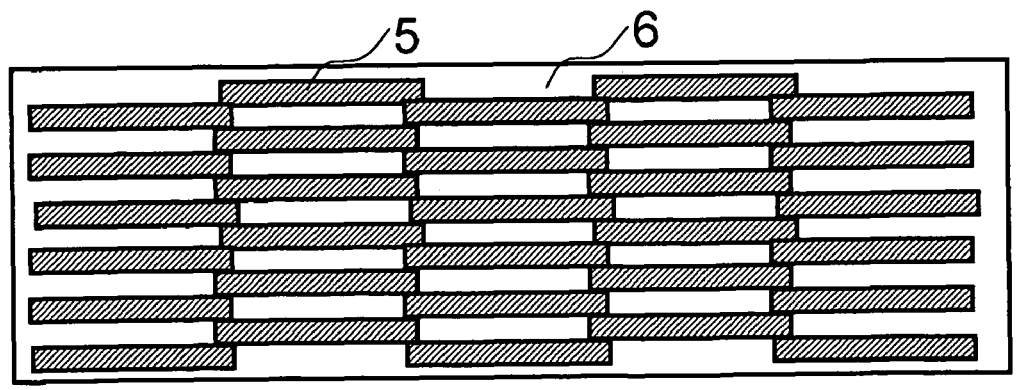

A lighting device according to a second embodiment of the present invention will be described with reference to FIGS. 6A and 6B. FIG. 6A is a frontal view schematically showing the first transparent plate 3 in which the first phosphor layer 4 has been formed, and FIG. 6B is a frontal view schematically showing the second transparent plate 6 in which the second phosphor layer 5 has been formed. The basic structure of the transparent plates 3 and 6 in the second embodiment is the same as in the first embodiment. The difference from the first embodiment is the shape of the phosphor layers formed by application to the transparent plates 3 and 6. The grooves cut in the transparent plate 3 are 0.1 mm to 0.5 mm in depth, 0.5 mm to 10 mm in width and length, and form a matrix-like pattern. In the first embodiment, the phosphor layer and the non-phosphor layer are formed alternately to make a stripe pattern perpendicular to the sliding direction (a direction in which the second transparent plate 6 is moved). In this embodiment, the phosphor layer is formed such that its longer sides are parallel to the sliding direction. Setting the longer sides of the phosphor layer parallel to the sliding direction reduces the ratio of the chromaticity change amount to the sliding distance, thus facilitating fine color adjustment. Also, arranging the phosphor layer regions into a matrix pattern makes it possible to mix colors so finely that color break-up is prevented. The phosphor layer regions (dots) arranged into a matrix pattern are not in independent grooves isolated from one another but are structurally connected with one another, so that all the area of the grooves are filled with transparent resin in which a phosphor is dispersed by simply pouring the resin into one of the grooves, instead of pouring the resin into one dot at a time. This simplifies the process and reduces phosphor density fluctuations among the dots.

A lighting device according to a third embodiment of the present invention will be described with reference to FIGS. 7A and 7B. FIG. 7A is a frontal view schematically showing the first transparent plate 3 in which the first phosphor layer 4 has been formed, and FIG. 7B is a frontal view schematically showing the second transparent plate 6 in which the second phosphor layer 5 has been formed. The differences from the first and second embodiments are the shape of the transparent plates 3 and 6 and the shape of the phosphor layers formed by application to the transparent plates 3 and 6. The first transparent plate 3 is placed above the light source. The first transparent plate 3 in the third embodiment has an approximately circular shape, and the first phosphor layer 4 forms fans spread in a spoke-like manner from the center of the circle at an equal pitch. Other regions of the first transparent plate 3 than the fan-shaped regions where the first phosphor layer 4 is formed remain transparent. The second transparent plate 6 with the second phosphor layer 5 has the same shape as that of the first transparent plate 3. The first transparent plate 3 is interposed between the light source and the second transparent plate 6. The first phosphor layer 4 employs a green phosphor and the second phosphor layer 5 employs a red phosphor. The second transparent plate 6 in which the second phosphor layer 5 is formed is rotatable. The second transparent plate 6 rotates about the center of the first transparent plate 3 in which the first phosphor layer 4 is formed. Therefore, rotating the second transparent plate 6 in which the second phosphor layer 5 is formed varies how much the first phosphor layer 4 (green phosphor) and the second phosphor layer 5 (red phosphor) overlap with each other, thereby making color adjustment possible.

A lighting device according to a fourth embodiment of the present invention will be described with reference to FIGS. 8A and 8B. FIG. 8A is a frontal view schematically showing the first transparent plate 3 in which the first phosphor layer 4 has been formed, and FIG. 8B is a frontal view schematically showing the second transparent plate 6 in which the second phosphor layer 5 has been formed. The difference from the third embodiment is the shape of the phosphor layers formed by application to the transparent plates 3 and 6. In this embodiment, the phosphor layers 4 and 5 are each formed as rectangular strips, which are arranged concentrically on the circular transparent plate and are not connected with one another. Giving the phosphor layers a rectangular shape or a dot shape makes it possible to mix colors so finely that color break-up is prevented as in the second embodiment. In this process, the center of the first transparent plate 3 and the center of the second transparent plate 6 have to coincide with each other and the shape and arrangement of the regions where the first phosphor layer 4 (green phosphor) and the second phosphor layer 5 (red phosphor) are formed need to be determined in a manner that causes the rotation of the second transparent plate 6 to vary how much the phosphor layers 4 and 5 overlap with each other.

A lighting device according to a fifth embodiment of the present invention will be described with reference to FIGS. 7A and 7B. The differences from the third embodiment are the mechanism for rotating the second transparent plate 6 in which the second phosphor layer 5 is formed and a new feature of making the light emission source blink in time with the rotation. When the first phosphor layer 4 employs a green phosphor and the second phosphor layer 5 employs a red phosphor, color can be adjusted by controlling the ratio of a lit-up period during which the green phosphor layer and the red phosphor layer overlap with each other to a lit-up period during which the green phosphor layer and the red phosphor layer do not overlap with each other. Specifically, setting the lit-up period during which the green phosphor layer and the red phosphor layer overlap with each other longer makes the resultant light redder. The effect of this embodiment is also obtained when the phosphor layers 4 and 5 are each shaped as rectangular strips as in the fourth embodiment.

Figure 9:
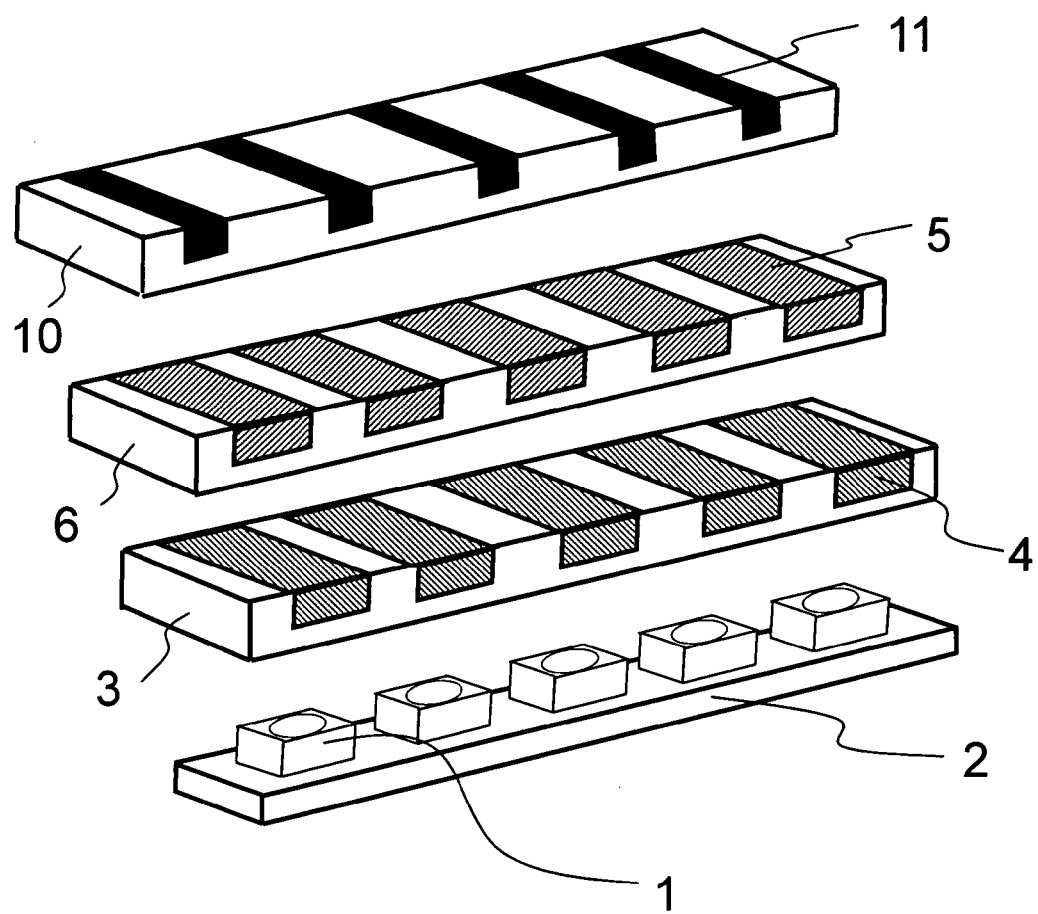
FIG. 9 is a perspective view schematically showing the structure of a light source portion of yet still another lighting device according to the present invention.

A lighting device according to a sixth embodiment of the present invention will be described with reference to FIG. 9. FIG. 9 is a perspective view schematically showing the structure of a light source portion of yet still another lighting device according to the present invention. The difference from the first embodiment is that a third transparent plate 10 in which a color filter layer 11 is formed in places is added to be placed above the second transparent plate 6 in which the second phosphor layer 5 is formed. This embodiment discusses a case where the color filter layer 11 is a black filter, which absorbs most of visible light, but the color filter layer 11 may be a filter that absorbs only a specific wavelength. Filter characteristics suitable for the desired color and the characteristics of the phosphors used should be chosen.

Whereas the color tone is adjusted in the first to fifth embodiments solely by varying how much in terms of area multiple phosphor layers overlap with each other in the light path, this embodiment has an additional feature of eliminating an unwanted color. For instance, the second transparent plate 6 is positioned such that the first phosphor layer 4 and the second phosphor layer 5 hardly overlap with each other in the light path as shown in FIG. 3. The position of the third transparent plate 10 is then adjusted such that the color filter layer 11 is situated over the first phosphor layer 4 alone. This excludes light that exits the first phosphor layer 4 from the color mixing. In other words, a color converted in the first phosphor layer 4 is eliminated from the color mixture. When the first phosphor layer 4 is a green phosphor layer and the second phosphor layer 5 is a red phosphor layer, the exit light has a color that is a mixture of blue and red. On the contrary, when the position of the third transparent plate 10 is adjusted so that the color filter layer 11 is situated over the red phosphor layer alone, the exit light has a color that is a mixture of blue and green.

The above structure widens the range of color adjustment greatly. The color filter layer 11 can be added to all of the above first to fifth embodiments, and the addition brings about the effect of expanding the color adjustment range.

A light source having the structure of any of the above first to sixth embodiments is applicable to liquid crystal displays.

What is claimed is:

1. A lighting device, comprising:
   a first member having a region where a first phosphor is present and a region where the first phosphor is absent; and
   a second member having a region where a second phosphor is present and a region where the second phosphor is absent,
   wherein the first member and the second member are put in a path of light emitted by a light emitting element, and are arranged in a manner that allows the region where the first phosphor is present and the region where the second phosphor is present to overlap with each other in a varying amount which is measured by area.

2. A lighting device according to claim 1, wherein the region where the first phosphor is present is shaped like a matrix in which rectangular unit regions are arranged into a matrix pattern.

3. A lighting device according to claim 2, wherein longer sides of the rectangular unit regions are set parallel to a moving direction of the second member.

4. A lighting device according to claim 2, wherein the rectangular unit regions are in contact with adjacent unit regions.

5. A lighting device according to claim 1, wherein the first member and the second member are circular members, and the first phosphor and the second phosphor are put in some places of the circular members.

6. A lighting device according to claim 5,
   wherein the circular members are partially rotated, and
   wherein light emission by the light emitting element is timed with a change in how much in terms of area the region where the first phosphor is present and the region where the second phosphor is present overlap with each other.

7. A lighting device according to claim 1, further comprising a third member in which a color filter layer is formed in places and which is placed nearer to a light exit side than the first member and the second member.

8. A lighting device according to claim 1, wherein the first phosphor is a green phosphor and the second phosphor is a red phosphor.

9. A lighting device according to claim 8, wherein the green phosphor contains at least one of strontium thiogallate activated with a rare earth element, barium strontium silicate activated with a rare earth element, and $Ca_3Sc_2Si_3O_{12}$:Ce.

10. A lighting device according to claim 8, wherein the red phosphor contains at least one of phosphors that are obtained by doping each of CaS, SrS, $(Ca, Sr)_2Si_5N_8$, $CaSiN_2$, and $CaAlSiN_3O_{12}$ with a rare earth dopant.

11. A display comprising:
    a lighting device; and
    a non-self-luminous display element provided on an irradiating surface side of the lighting device,
    wherein the lighting device places a first member having a region where a first phosphor is present and a region where the first phosphor is absent and a second member having a region where a second phosphor is present and a region where the second phosphor is absent in a path of light emitted by a light emitting element, and
    wherein the first member and the second member are arranged in a manner that allows the region where the first phosphor is present and the region where the second phosphor is present to overlap with each other in a varying amount which is measured by area.

* * * * *